United States Patent [19]

Tajima et al.

[11] Patent Number: 5,824,618
[45] Date of Patent: Oct. 20, 1998

[54] CATALYST COMPONENTS FOR POLYMERIZATION OF OLEFINS

[75] Inventors: Yoshio Tajima; Naoki Kataoka; Yosuke Numao; Takashi Seki; Kazuo Matsuura, all of Yokohama, Japan

[73] Assignee: Nippon Oil Co., Ltd., Tokyo, Japan

[21] Appl. No.: 467,494

[22] Filed: Jun. 6, 1995

Related U.S. Application Data

[63] Continuation of Ser. No. 905,583, Jun. 26, 1992, Pat. No. 5,451,555.

[30] Foreign Application Priority Data

Jun. 27, 1991 [JP] Japan ................................. 3-183272
Sep. 27, 1991 [JP] Japan ................................. 3-276673

[51] Int. Cl.⁶ .................. B01J 31/00; B01J 37/00; C08F 4/02; C08F 4/60
[52] U.S. Cl. .................. 502/108; 502/114; 502/116; 502/118; 502/129; 502/132; 502/133; 502/134; 502/150; 502/158; 526/124.7; 526/152; 526/151
[58] Field of Search .................. 502/108, 116, 502/118, 150, 158, 114, 129, 132, 133, 134

[56] References Cited

U.S. PATENT DOCUMENTS

| | | | |
|---|---|---|---|
| 3,300,458 | 1/1967 | Manyik et al. | 502/118 |
| 3,787,323 | 1/1974 | Aishima et al. | 502/103 |
| 3,939,137 | 2/1976 | Hogan et al. | 502/158 |
| 4,136,243 | 1/1979 | Appleyard et al. | 502/118 |
| 4,359,561 | 11/1982 | Fraser et al. | 526/88 |
| 4,542,199 | 9/1985 | Kaminsky et al. | 502/117 |
| 4,565,798 | 1/1986 | Yamamoto et al. | 502/118 |
| 4,717,783 | 1/1988 | Dubois et al. | 502/158 |
| 4,752,597 | 6/1988 | Turner | 502/103 |
| 4,772,734 | 9/1988 | Dubois et al. | 502/158 |
| 4,794,096 | 12/1988 | Ewen | 502/117 |
| 4,910,178 | 3/1990 | Malpass et al. | 502/108 |
| 5,021,382 | 6/1991 | Malpass, Jr. et al. | 502/117 |
| 5,104,838 | 4/1992 | Fujita et al. | 502/127 |
| 5,451,555 | 9/1995 | Tajima et al. | 502/103 |
| 5,643,845 | 7/1997 | Tajima et al. | 502/108 |
| 5,644,009 | 7/1997 | Tsai et al. | 502/158 |
| 5,707,914 | 1/1998 | Kataoka et al. | 502/114 |

FOREIGN PATENT DOCUMENTS

| | | | |
|---|---|---|---|
| A 0283739 | 9/1988 | European Pat. Off. | |
| A 0311449 | 4/1989 | European Pat. Off. | |
| A 0433987 | 6/1991 | European Pat. Off. | |
| A 1720785 | 7/1971 | Germany. | |
| 44-21338 | 9/1969 | Japan | 502/108 |
| A 58-019309 | 2/1983 | Japan. | |
| A 63-251405 | 10/1988 | Japan. | |
| 733718 | 5/1980 | U.S.S.R. | 502/108 |
| 934119 | 8/1963 | United Kingdom | 502/158 |

*Primary Examiner*—Mark L. Bell
*Assistant Examiner*—J. Pasterezyk
*Attorney, Agent, or Firm*—Panitch Schwarze Jacobs & Nadel, P.C.

[57] ABSTRACT

A catalyst component is disclosed for use in the homo- or copolymerization of olefinic hydrocarbons. The catalyst component is comprised of a first compound of the formula $M^1(OR^1)_p R^2_q X^1_{4-p-q}$, $M^1$ being titanium a second compound of the formula $M^2(OR^3)_m R^4_n X^2_{z-m-n}$, with $M^2$ being a metal of Groups Ia–IIIa or IIb of the Periodic Table, and a third compound which is an organocyclic compound having two or more conjugated double bonds. A process is also disclosed for the production of hydrocarbon polymers in which the above catalyst component is combined with a modified organoaluminum compound to form a catalyst composition capable of providing controlled molecular weight, wide distribution thereof and other desirable qualities in the polymer product.

15 Claims, No Drawings

CATALYST COMPONENTS FOR POLYMERIZATION OF OLEFINS

This is a continuation of application Ser. No. 07/905,583, filed Jun. 26, 1992, now U.S. Pat. No. 5,451,555.

BACKGROUND OF THE INVENTION

1. Field of the Invention

This invention relates to catalyst components for use in the polymerizaion of olefinic hydrocarbons. The invention is also directed to a process for the manufacture of olefinic polymers in which the aforesaid catalyst components are employed.

2. Prior Art

Catalyst compositions comprising zirconium compounds, typically metallocene, and alumoxane are known for use in the homopolymerization of olefins such as ethylene or the copolymerization of ethylene/alpha-olefins as disclosed for example in Japanese Laid-Open Patent Publication No. 58-19309. While the disclosed prior art process is advantageous so far as concerns the availability of polymerized products at increased rate of yield, it has a drawback in that the polymers obtained have a relatively low molecular weight and further that they, if homopolymeric, have a relatively narrow molecular weight distribution. When taking into account the molecular weight alone, it would be possible to increase the molecular weight of a polymer to some extent by making a proper selection of transition metals from among the group of metallocene. It has been proposed to use dicyclopentadienyl hafnium as disclosed for example in Japanese Laid-Open Patent Publication No. 63-251405. However, hafnium compounds are not only difficult to synthesize but also less active compared to dicyclopentadienyl zirconium. The use of dicyclopentadienyl hafnium would not provide any appreciable increase in the breadth of molecular weight distribution of the polymer produced, or would not help in providing sufficiently narrow composition distribution of the polymer when the latter is a copolymer.

SUMMARY OF THE INVENTION

With the foregoing drawbacks of the prior art in view, the present invention seeks to provide novel catalyst components which, when combined with a promoter such as an organoaluminum compound, will greatly contribute to the production of polyolefins having a controlled level of molecular weight distribution and a relatively narrow composition distribution where the polyolefin is a copolymer.

The invention also seeks to provide a process for the homopolymerization or copolymerization of olefinic hydrocarbons in which there is used a catalyst composition comprising a novel catalyst component and a promoter which has enhanced catalytic activity per given transition metal and is capable of providing olefinic polymers having a relatively high molecular weight.

According to the invention, there is provided a catalyst component comprising a compound (A) of the formula $$M^1(OR^1)_p R^2_q X^1_{4-p-q}$$

where $R^1$ and $R^2$ each are hydrocarbon moieties of 1–24 carbon atoms; $X^1$ is a halogen atom; $M^1$ Ti, Zr or Hf; p is $0 \leq p \leq 4$; q is $0 \leq q \leq 4$; and p+q is $0 \leq p+q \leq 4$, a compound (B) of the formula $$M^2(OR^3)_m R^4_n X^2_{z-m-n}$$

where $R^3$ and $R^4$ each are hydrocarbon moieties of 1–24 carbon atoms; $X^2$ is a halogen atom; $M^2$ is an element included in Groups I–III of the Periodic Table; z is a valence of $M^2$; m is $0 \leq m \leq 3$; n is $0 \leq n \leq 3$; and m+n is $1 \leq n+m \leq 3$, and an organocyclic compound (C) having two or more conjugated double bonds.

A polymerization process according to the invention comprises homopolymerizing or copolymerizing olefinic hydrocarbons in the presence of a catalyst composition comprising a catalyst component comprising a compound (A) of the formula $$M^1(OR^1)_p R^2_q X^1_{4-p-q}$$

where $R^1$ and $R^2$ each are hydrocarbon moieties of 1–24 carbon atoms; $X^1$ is a halogen atom; $M^1$ is Ti, Zr or Hf; p is $0 \leq p \leq 4$; q is $0 \leq q \leq 4$; and p+q is $0 \leq p+q \leq 4$, a compound (B) of the formula $$M^2(OR^3)_m R^4_n X^2_{z-m-n}$$

where $R^3$ and $R^4$ each are hydrocarbon moieties of 1–24 carbon atoms; $X^2$ is a halogen atom; $M^2$ is an element included in Groups I–III of the Periodic Table; z is a valence of $Me^2$; m is $0 \leq m \leq 3$; n is $0 \leq n \leq 3$; and m+n is $1 \leq n+m \leq 3$, and an organocyclic compound (C) having two or more conjugated double bonds, and a modified organoaluminum compound having an Al—O—Al group.

It has now been found that in addition to the above mentioned features, the use of the inventive catalyst component provides a copolymer, typically an ethylene/alpha-olefin copolymer, which may be formed into sheets or films that are free from sticking with each other.

DETAILED DESCRIPTION OF THE INVENTION

The catalyst component of the invention is, as above described, comprised of Compound (A) and Compound (B) which are contacted together.

Compound (A) is represented by the general formula $$M^1(OR^1)_p R^2_q X^1_{4-p-q}$$

$R^1$ and $R^2$ respectively designate separate hydrocarbon moieties each having a carbon number 1–24, preferably 1–12, more preferably 1–8, which include alkyl groups such as methyl, propyl, butyl, pentyl, hexyl and octyl, alkonyl groups such as vinyl and allyl, aryl groups such as phenyl, tolyl and xylyl and aralkyl groups such as benzyl, phenethyl styryl and neophyl. If there are more than two members $R^1$ and $R^2$, they may be the same or different.

$X^1$ is a halogen atom such as fluorine, iodine, chlorine and bromine. $M^1$ designates zirconium Zr, titanium Ti and hafnium Hf, of which Zr is preferred, p is $0 \leq p \leq 4$, preferably $0 < p \leq 4$; q is $0 \leq q \leq 4$, preferably $0 < q \leq 4$; and p+q is $0 \leq p+q \leq 4$, preferably $0 < p+q \leq 4$.

Specific examples of Compound (A) include tetramethyl zirconium, tetraethyl zirconium, tetrapropyl zirconium, tetra-n-butyl zirconium, tetrapentyl zirconium, tetraphenyl zirconium, tetratolyl zirconium, tetrabenzyl zirconium, tetramethoxy zirconium, tetraethoxy zirconium, tetrapropoxy zirconium, tetrabutoxy zirconium, tetraphenoxy zirconium, tetratolyloxy zirconium, tetrapentyloxy zirconium, tetrabenzyloxy zirconium, tetraallyl zirconium, tetraneophyl zirconium, trimethylmonochlorozirconium, triethylmonochlorozirconium, tripropylmonochlorozirconium, tri-n-butylmonochlorozirconium, tribenzylmonochlorozirconium, dimethyldichlorozirconium, diethyldichlorozirconium, di-n-butyldichlorozirconium, dibenzyldichlorozirconium, monomethyltrichlorozirconium, monoethyltrichlorozirconium, mono-n-butyltrichlorozirconium, monobenzyltrichlorozirconium, tetrachlorozirconium, tetramethoxyzirconium, trimethoxymonochlorozirconium, dimethoxydichlorozirconium, monomethoxytrichlorozirconium, tetraethoxyzirconium, triethoxymonochlorozirconium, diethoxydichlorozirconium, monoethoxytrichlorozirconium, tetraisopropoxyzirconium, triisopropoxymonochlorozirconium, diisopropoxydichlorozirconium, monoisopropoxytrichlorozirconium, tetra-n-butoxyzirconium, tri-ni-butoxymonochlorozirconium, di-n-butoxydichlorozirconium, mono-n-butoxytrichlorozirconium, tetrapentoxyzirconium, tripentoxymonochlorozirconium, dipentoxydichlorozirconium, monopentoxytrichlorozirconium, tetraphenoxyzirconium, triphenoxymonochlorozirconium, diphenoxydichlorozirconium, monophenoxytrichlorozirconium, tetratolyloxyzirconium, tritolyloxymonochlorozirconium, ditolyloxydichlorozirconium, monotolyloxytrichlorozirconium, tetrabenzyloxyzirconium, tribenzyloxymonochlorozirconium, dibenzyloxydichlorozirconium, monobenzyloxytrichlorozirconium, trimethylmonobromozirconium, triethylmonobromozirconium, tripropylmonobromozirconium, tri-n-butylmonobromozirconium, tribenzylmonobromozirconium, dimethyldibromozirconium, diethyldibromozirconium, di-n-butyldibromozirconium, dibenzyldibromozirconium, monomethyltribromozirconium, monoethyltribromozirconium, mono-n-butyltribromozirconium, monobenzyltribromozirconium, tetrabromozirconium, trimethoxymonobromozirconium, dimethoxydibromozirconium, monomethoxytribromozirconium, triethoxymonobromozirconium, diethoxydibromozirconium, monoethoxytribromozirconium, triisopropoxymonobromozirconlum, diisopropoxydibromozirconium, monoisopropoxytribromozirconium, tri-n-butoxymonobromozirconium, di-n-butoxydibromozirconium, mono-n-butoxytribromozirconium, tripentoxymonobromozirconium, dipentoxydibromozirconium, monopentoxytribromozirconium, triphenoxymonobromozirconium, diphenoxydibromozirconium, monophenoxytribromozirconium, tritolyloxymonobromozirconium, ditolyloxydibromozirconium, monotolyloxytribromozirconium, tribenzyloxymonobromozirconium, dibenzyloxydibromozirconium, monobenzyloxytribromozirconium, trimethylmonoiodozirconium, triethylmonoiodozirconium, tripropylmonoiodozirconium, tri-n-butylmonoiodozirconium, tribenzylmonoiodozirconium, dimethyldiiodozirconium, diethyldiiodozirconium, dipropyldiiodozirconium, di-n-butyldiiodozirconium, dibenzyldiiodozirconium, monomethyltriiodozirconium, monoethyltriiodozirconium, monopropyltriiodozirconium, mono-n-butyltriiodozirconium, monobenzyltriiodozirconium, tetraiodozirconium, trimethoxymonoiodozirconium, dimethoxydiiodozirconium, monomethoxytriiodozirconium, triethoxymonoiodozirconium, diethoxydiiodozirconium, monoethoxytriiodozirconium, triisopropoxymonoiodozirconium, diisopropoxydiiodozirconium, monoisopropoxytriiodozirconium, tri-n-butoxymonoiodozirconium, di-n-butoxydiiodozirconium, mono-n-butoxytriiodozirconium, tripentoxymonoiodozirconium, dipentoxydiiodozirconium, monopentoxytriiodozirconium, triphenoxymonoiodozirconium, diphenoxydiiodozirconium, monophenoxytriiodozirconium, tritolyloxymonoiodozirconium, ditolyloxydiiodozirconium, monotolyoxytriiodozirconium, tribenzyloxymonoiodozirconium, dibenzyloxydiiodozirconium, monobenzyloxytriiodozirconium, tribenzylmonomethoxyzirconium, tribenzylmonoethoxyzirconium, tribenzylmonopropoxyzirconium, tribenzylmonobutoxyzirconium, tribenzylmonophenoxyzirconium, dibenzyldimethoxyzirconium, dibenzyldiethoxyzirconium, dibenzyldipropoxyzirconium, dibenzyldibutoxyzirconium, dibenzyldiphenoxyzirconium, monobenzyltrimethoxyzirconium, monobenzyltriethoxyzirconium, monobenzyltripropoxyzirconium, monobenzyltributoxyzirconium, monobenzyltriphenoxyzirconium, trineophylmonomethoxyzirconium, trineophylmonoethoxyzirconium, trineophylmonopropoxyzirconium, trineophylmonobutoxyzirconium, trineophylmonophenoxyzirconium, dineophyldimethoxyzirconium, dineophyldiethoxyzirconium, dineophyldipropoxyzirconium, dineophyldibutoxyzirconium, dineophyldiphenoxyzirconium, mononeophyltrimethoxyzirconium, mononeophyltriethoxyzirconium, mononeophyltripropoxyzirconium, mononeophyltributoxyzirconium, mononeophyltriphenoxyzirconium, tetramethyl titanium, tetraethyl titanium, tetrapropyl titanium, tetra-n-butyl titanium, tetrapentyl titanium, tetraphenyl titanium, tetratolyl titanium, tetrabenzyl titanium, tetramethoxy titanium, tetraethoxy titanium, tetrapropoxy titanium, tetrabutoxy titanium, tetraphenoxy titanium, tetratolyloxy titanium, tetrapentyloxy titanium, tetrabenzyloxy titanium, tetraallyl titanium, tetraneophyl titanium, trimethylmonochlorotitanium, triethylmonochlorotitanium, tripropylmonochlorotitanium, tri-n-butylmonochlorotitanium, tribenzylmonochlorotitanium, dimethyldichlorotitanium, diethyldichlorotitanium, di-n-butyldichlorotitanium, dibenzyldichlorotitanium, monomethyltrichlorotitanium, monoethyltrichlorotitanium, mono-n-butyltrichlorotitanium, monobenzyltrichlorotitanium, tetrachlorotitanium, tetramethoxytitanium, trimethoxymonochlorotitanium, dimethoxydichlorotitanium, monomethoxytrichlorotitanium, tetraethoxytitanium, triethoxymonochlorotitanium, diethoxydichlorotitanium, monoethoxytrichlorotitanium, tetraisopropoxytitanium, triisopropoxymonochlorotitanium, diisopropoxydichlorotitanium, monoisopropoxytrichlorotitanium, tetra-n-butoxytitanium, tri-ni-butoxymonochlorotitanium, di-n-butoxydichlorotitanium, mono-n-butoxytrichlorotitanium, tetrapentoxytitanium, tripentoxymonochlorotitanium, dipentoxydichlorotitanium, monopentoxytrichlorotitanium, tetraphenoxytitanium, triphenoxymonochlorotitanium, diphenoxydichlorotiltanium, monophenoxytrichlorotitanium, tetratolyloxytitanium, tritolyloxymonochlorotitanium, ditolyloxydichlorotitanium, monotolyoxyltrichlorotitanium, tetrabenzyloxytitanium, tribenzyloxymonochlorotitanium, dibenzyloxydichlorotitanium, monobenzyloxytrichlorotitanium, trimethylmonobromotitanium, triethylmonobromotitanium, tripropylmonobromotitanium, tri-n-butylmonobromotitanium, tribenzylmonobromotitanium, dimethyldibromotitanium, diethyldibromotitanium, di-n-butyldibromotitanium, dibenzyldibromotitanium, monomethyltribromotitanium, monoethyltribromotitanium, mono-n-butyltribromotitanium, monobenzyltribromotitanium, tetrabromotitanium, trimethoxymonobromotitanium, dimethoxydibromotitanium, monomethoxytribromotitanium, triethoxymonobromotitanium, diethoxydibromotitanium, monoethoxytribromotitanium, triisopropoxymonobromotitanium, diisopropoxydibromotitanium, monoisopropoxytribromotitanium, tri-n-butoxymonobromotitanium, di-n-butoxydibromotitanium, mono-n-butoxytribromotitanium, tripentoxymonobromotitanium, dipentoxydibromotitanium, monopentoxytribromotitanium, triphenoxymonobromotitanium, diphenoxydibromotitanium, monophenoxytribromotitanium, tritolyloxymonobromotitanium, ditolyloxydibromotitanium, monotolyloxytribromotitanium, tribenzyloxymonobromotitanium, dibenzyloxydibromotitanium, monobenzyloxytribromotitanium, trimethylmonoiodotitanium, triethylmonoiodotitanium, tripropylmonoiodotitanium, tri-n-butylmonoiodotitanium, tribenzylmonoiodotitanium, dimethyldiiodotitanium, diethyldiiodotitanium, dipropyldiiodotitanium, di-n-butyldiiodotitanium, dibenzyldiiodotitanium, monomethyltriiodotitanium, monoethyltriiodotitanium, monopropyltriiodotitanium, mono-n-butyltriiodotitanium, monobenzyltriiodotitanium, tetraiodotitanium, trimethoxymonoiodotitanium, dimethoxydiiodotitanium, monomethoxytriiodotitanium, triethoxymonoiodotitanium, diethoxydiiodotitanium, monoethoxytriiodotitanium, triisopropoxymonoiodotitanium, diisopropoxydiiodotitanium, monoisopropoxytriiodotitanium, tri-n-butoxymonoiodotitanium, di-n-butoxydiiodotitanium, mono-n-butoxytriiodotitanium, tripentoxymonoiodotitanium, dipentoxydiiodotitanium, monopentoxytriiodotitanium, triphenoxymonoiodotitanium, diphenoxydiiodotitanium, monophenoxytriiodotitanium, tritolyloxymonoiodoiodotitanium, ditolyloxydiiodotitanium, monotolyloxytriiodotitanium, tribenzyloxymonoiodotitanium, dibenzyloxydiiodotitanium, monobenzyloxytriiodotitanium, tribenzylmonomethoxytitanium, tribenzylmonoethoxytitanium, tribenzylmonopropoxytitanium, tribenzylmonobutoxytitanium, tribenzylmonophenoxytitanium, dibenzyldimethoxytitanium, dibenzyldiethoxytitanium, dibenzyldipropoxytitanium, dibenzyldibutoxytitanium, dibenzyldiphenoxytitanium, monobenzyltrimethoxytitanium, monobenzyltriethoxytitanium, monobenzyltripropoxytitanium, monobenzyltributoxytitanium, monobenzyltriphenoxytitanium, trineophylmonomethoxytitanium, trineophylmonoethoxytitanium, trineophylmonopropoxytitanium, trineophylmonobutoxytitanium, trineophylmonophenoxytitanium, dineophyldimethoxytitanium, dineophyldiethoxytitanium, dineophyldipropoxytitanium, dineophyldibutoxytitanium, dineophyldiphenoxytitanium, mononeophyltrimethoxytitanium, mononeophyltriethoxytitanium, mononeophyltripropoxytitanium, mononeophyltributoxytitanium, mononeophyltriphenoxytitanium, tetramethyl hafnium, tetraethyl hafnium, tetrapropyl hafnium, tetra-n-butyl hafnium, tetrapentyl hafnium, tetraphenyl hafnium, tetratolyl hafnium, tetrabenzyl hafnium, tetramethoxy hafnium, tetraethoxy hafnium, tetrapropoxy hafnium, tetrabutoxy hafnium, tetraphenoxy hafnium, tetratolyloxy hafnium, tetrapentyloxy hafnium, tetrabenzyloxy hafnium, tetraallyl hafnium, tetraneophyl hafnium, trimethylmonochlorohafnium, triethylmonochlorohafnium, tripropylmonochlorohafnium, tri-n-butylmonochlorohafnium, tribenzylmonochlorohafnium, dimethyldichlorohafnium, diethyldichlorohafnium, di-n-butyldichlorohafnium, dibenzyldichlorohafnium, monomethyltrichlorohafnium, monoethyltrichlorohafnium, mono-n-butyltrichlorohafnium, monobenzyltrichlorohafnium, tetrachlorohafnium, tetramethoxyhafnium, trimethoxymonochlorohafnium, dimethoxydichlorohafnium, monomethoxytrichlorohafnium, tetraethoxyhafnium, triethoxymonochlorohafnium, diethoxydichlorohafnium, monoethoxytrichlorohafnium, tetraisopropoxyhafnium, triisopropoxymonochlorohafnium, diisopropoxydichlorohafnium, monoisopropoxytrichlorohafnium, tetra-n-butoxyhafnium, tri-ni-butoxymonochlorohafnium, di-n-butoxydichlorohafnium, mono-n-butoxytrichlorohafnium, tetrapentoxyhafnium, tripentoxymonochlorohafnium, dipentoxydichlorohafnium, monopentoxytrichlorohafnium, tetraphenoxyhafnium, triphenoxymonochlorohafnium, diphenoxydichlorohafnium, monophenoxytrichlorohafnium, tetratolyloxyhafnium, tritolyloxymonochlorohafnium, ditolyloxydichlorohafnium, monotolyloxytrichlorohafnium, tetrabenzyloxyhafnium, tribenzyloxymonochlorohafnium, dibenzyloxydichlorohafnium, monobenzyloxytrichlorohafnium, trimethylmonobromohafnium, triethylmonobromohafnium, tripropylmonobromohafnium, tri-n- butylmonobromohafnium, tribenzylmonobromohafnium, dimethyldibromohafnium, diethyldibromohafnium, di-n-butyldibromohafnium, dibenzyldibromohafnium, monomethyltribromohafnium, monoethyltribromohafnium, mono-n-butyltribromohafnium, monobenzyltribromohafnium, tetrabromohafnium, trimethoxymonobromohafnium, dimethoxydibromohafnium, monomethoxytribromohafnium, triethoxymonobromohafnium, diethoxydibromohafnium, monoethoxytribromohafnium, triisopropoxymonobromohafnium, diisopropoxydibromohafnium, monoisopropoxytribromohafnium, tri-n-butoxymonobromohafnium, di-n-butoxydibromohafnium, mono-n-butoxytribromohafnium, tripentoxymonobromohafnium, dipentoxydibromohafnium, monopentoxytribromohafnium, triphenoxymonobromohafnium, diphenoxydibromohafnium, monophenoxytribromohafnium, tritolyloxymonobromohafnium, ditolyloxydibromohafnium, monotolyloxytribromohafnium, tribenzyloxymonobromohafnium, dibenzyloxydibromohafnium, monobenzyloxytribromohafnium, trimethylmonoiodohafnium, triethylmonoiodohafnium, tripropylmonoiodohafnium, tri-n-butylmonoiodohafnium, tribenzylmonoiodohafnium, dimethyldiioxohafnium, diethyldiioxohafnium, dipropyldiioxohafnium, di-n-butyldiioxohafnium, dibenzyldiioxohafnium, monomethyltriiodohafnium, monoethyltriiodohafnium, monopropyltriiodohafnium, mono-n-butyltriiodohafnium, monobenzyltriiodohafnium, tetraiodohafnium, trimethoxymonoiodohafnium, dimethoxydiiodohafnium, monomethoxytriiodohafnium, triethoxymonoiodohafnium, diethoxydiiodohafnium, monoethoxytriiodohafnium, triisopropoxymonoiodohafnium, diisopropoxydiiodohafnium, monoisopropoxytriiodohafnium, tri-n-butoxymonoiodohafnium, di-n-butoxydiiodohafnium, mono-n-butoxytriiodohafnium, tripentoxymonoiodohafnium, dipentoxydiiodohafnium, monopentoxytriiodohafnium, triphenoxymonoiodohafnium, diphenoxydiiodohafnium, monophenoxytriiodohafnium, tritolyloxymonoiodoiodohafnium, ditolyloxydiiodohafnium, monotolyloxytriiodohafnium, tribenzyloxymonoiodohafnium, dibenzyloxydiiodohafnium, monobenzyloxytriiodohafnium, tribenzylmonomethoxyhafnium, tribenzylmonoethoxyhafnium, tribenzylmonopropoxyhafnium, tribenzylmonobutoxyhafnium, tribenzylmonophenoxyhafnium, dibenzyldimethoxyhafnium, dibenzyldiethoxyhafnium, dibenzyldipropoxyhafnium, dibenzyldibutoxyhafnium, dibenzyldiphenoxyhafnium, monobenzyltrimethoxyhafnium, monobenzyltriethoxyhafnium, monobenzyltripropoxyhafnium, monobenzyltributoxyhafnium, monobenzyltriphenoxyhafnium, trineophylmonomethoxyhafnium, trineophylmonoethoxyhafnium, trineophylmonopropoxyhafnium, trineophylmonobutoxyhafnium, trineophylmonophenoxyhafnium, dineophyldimethoxyhafnium, dineophyldiethoxyhafnium, dineophyldipropoxyhafnium, dineophyldibutoxyhafnium, dineophyldiphenoxyhafnium, mononeophyltrimethoxyhafnium, mononeophyltriethoxyhafnium, mononeophyltripropoxyhafnium, mononeophyltributoxyhafnium, mononeophyltriphenoxyhafnium and the like.

Compound (B) in the inventive catalyst component is represented by the formula $$M^2(OR^3)_m R^4_n X^2_{z-m-n}$$

In the above formula, $R^3$ and $R^4$ respectively designate separate hydrocarbon moieties each having a carbon number 1–24, preferably 1–12, more preferably 1–8, which include alkyl groups such as methyl, ethyl, propyl, isopropyl, butyl, pentyl, hexyl, octyl, decyl and dodecyl, alkenyl groups such as vinyl and allyl, aryl groups such as phenyl, tolyl and xylyl and aralkyl groups such as benzyl, phenethyl and styryl. If there are more than two members $R^3$ and $R^4$, they may be the same or different. $X^2$ is a halogen atom such as fluorine, iodine, chlorine and bromine. $M^2$ is a Group I–III element of the Periodic Table including lithium, sodium, potassium, magnesium, calcium, zinc, boron and aluminum. z is a valence of $M^2$. m is $0 \leq m \leq 3$; n is $0 \leq n \leq 3$; and m+n is $1 \leq m+n \leq 3$.

Specific examples of Compound (B) include methyllithium, ethyllithium, n-propyllithium, isopropyllithium, n-butyllithium, t-butyllithium, pentyllithium, octyllithium, phenyllithium, benzyllithium, dimethylmagnesium, diethylmagnesium, di-n-propylmagnesium, diisopropylmagnesium, di-n-butylmagnesium, di-t-butylmagnesium, dipentylmagnesium, dioctylmagnesium, diphenylmagnesium, dibenzylmagnesium, methylmagnesium chloride, ethylmagnesium chloride, n-propylmagnesium chloride, isopropylmagnesium chloride, n-butylmagnesium chloride, t-butylmagnesium chloride, pentylmagnesium chloride, octylmagnesium chloride, phenylmagnesium chloride, benzylmagnesium chloride, methylmagnesium bromide, methylmagnesium iodide, ethylmagnesium bromide, ethylmagnesium iodide, n-propylmagnesium bromide, n-propylmagnesium iodide, isopropylmagnesium bromide, isopropylmagnesium iodide, n-butylmagnesium bromide, n-butylmagnesium iodide, t-butylmagnesium bromide, t-butylmagnesium iodide, pentylmagnesium bromide, pentylmagnesium iodide, octylmagnesium bromide, octylmagnesium iodide, phenylmagnesium bromide, phenylmagnesium iodide, benzylmagnesium bromide, benzylmagnesium iodide, dimethylzinc, diethylzinc, di-n-propylzinc, diisopropylzinc, di-n-butylzinc, di-t-butylzinc, dipentylzinc, dioctylzinc, diphenylzinc, dibenzylzinc, trimethylboron, triethylboron, tri-n-propylboron, triisopropylboron, tri-n-butylboron, tri-t-butylboron, tripentylboron, trioctylboron, triphenylboron, tribenzylboron, trimethylaluminum, triethylaluminum, diethylaluminum chloride, diethylaluminum bromide, diethylaluminum fluoride diethylaluminum iodide, ethylaluminum dichloride, ethylaluminum dibromide, ethylaluminum difluoride, ethylaluminum diiodide, tripropylaluminum, dipropylaluminum chloride, dipropylaluminum bromide, dipropylaluminum fluoride, dipropylaluminum iodide, propylaluminum dichloride, propylaluminum dibromide, propylaluminum difluoride, propylaluminum diiodide, triisopropylaluminum, diisopropylaluminum chloride, diisopropylaluminum bromide, diisopropylaluminum fluoride diisopropylaluminum iodide, ethylaluminum sesquichloride, ethylaluminum sesquibromide, propylaluminum sesquichloride, propylaluminum sesquibromide, n-buthylaluminum sesquichloride, n-buthylaluminum sesquibromide, isopropylaluminum dichloride, isopropylaluminum dibromide, isopropylaluminum difluoride, isopropylaluminum diiodide, tributylaluminum, dibutylaluminum chloride, dibutylaluminum bromide, dibutylaluminum fluoride, dibutylaluminum iodide, butylaluminum dichloride, butylaluminum dibromide, butylaluminum difluoride, butylaluminum diiodide, tri-sec-butylaluminum, di-sec-butylaluminum chloride, di-sec-butylaluminum bromide, di-sec-butylaluminum fluoride, di-sec-butylaluminum iodide, sec-butylaluminum dichloride, sec-butylaluminum dibromide, sec-butylaluminum difluoride, sec-butylaluminum diiodide, tri-tert-butylaluminum, di-tert-butylaluminum chloride, di-tert-butylaluminum bromide, di-tert-butylaluminum fluoride, di-tert-butylaluminum iodide, tert-butylaluminum dichloride, tert-butylaluminum dibromide, tert-butylaluminum difluoride, tert-butylaluminum diiodide, triisobutylaluminum, diisobutylaluminum chloride, diisobutylaluminum bromide, diisobutylaluminum fluoride, diisobutylaluminum iodide, isobutylaluminum dichloride, isobutylaluminum dibromide, isobutylaluminum difluoride, isobutylaluminum diiodide, trihexylaluminum, dihexylaluminum chloride, dihexylaluminum bromide, dihexylaluminum fluoride, dihexylaluminum iodide, hexylaluminum dichloride, hexylaluminum dibromide, hexylalum rinum difluoride, hexylaluminum diiodide, tripentylaluminum, dipentylaluminum chloride, dipentylaluminum bromide, dipentylaluminum fluoride, dipentylaluminum iodide, pentylaluminum dichloride, pentylaluminum dibromide, pentylaluminum difluoride, pentylaluminum diiodide, methylaluminum dimethoxide, methylaluminum diethoxide, methylaluminum dipropoxide, methylaluminum dibutoxide, dimethylaluminum dimethoxide, dimethylaluminum ethoxide, dimethylaluminum propoxide, dimethylaluminum butoxide, ethylaluminum dimethoxide, ethylaluminum diethoxide, ethylaluminum dipropoxide, ethylaluminum dibutoxide, diethylaluminum methoxide, diethylaluminum ethoxide, diethylaluminum propoxide, diethylaluminum butoxide, propylaluminum dimethoxide, propylaluminum diethoxide, propylaluminum dipropoxide, propylaluminum dibutoxide, dipropylaluminum methoxide, dipropylaluminum ethoxide, dipropylaluminum propoxide, dipropylaluminum butoxide, butylaluminum dimethoxide, butylaluminum diethoxide, butylaluminum dipropoxide, butylaluminum dibutoxide, dibutylaluminum dimethoxide, dibutylaluminum ethoxide, dibutylaluminum propoxide, dibutylaluminum butoxide and the like.

Compound (C) is an organocyclic compound having two or more conjugated double bonds, examples of which include a cyclic hydrocarbon compound having two or more, preferably 2–4, more preferably 2–3 conjugated double bonds and a total carbon number of 4–24, preferably 4–12; said cyclic hydrocarbon compound partially substituted with 1–6 hydrocarbon moieties, typically alkyl or aralkyl groups of 1–12 carbon atoms; an organosilicon compound having two or more, preferably 2–4, more preferably 2–3 conjugated double bonds and cyclic hydrocarbon groups having a total carbon number of 4–24, preferably 4–12; and an organosilicon compound having said cyclic hydrocarbon groups partially substituted with 1–6 hydrocarbon moieties.

The organosilicon compound referred to above may be represented by the general formula

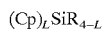

where Cp is a cyclic hydrocarbon group such as cyclopentadienyl, substituted cyclopentadienyl, indenyl and substituted indenyl groups; R is a hydrocarbon moiety of 1–24, preferably 1–12 carbon atoms exemplified by an alkyl group such as methyl, ethyl, propyl, isopropyl, butyl, t-butyl, hexyl and octyl, an alkoxy group such as methoxy, ethoxy, propoxy and butoxy, an aryl group such as phenyl, an aryloxy group such as phenoxy, and an aralkyl group such as benzyl, or hydrogen; and L is $1 \leq L \leq 4$, preferably $1 \leq L \leq 3$.

Specific examples of Compound (C) include cyclopolyenes or substituted cyclopolyenes having 7–24 carbon atoms such as cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, cycloheptatriene, methylcycloheptatriene, cyclooctatetraene, methylcyclooctatetraene, azulene, ethylazulene, fluorene, methylfluorene; monocyclopentadienylsilane, dicyclopentadienylsilane, tricyclopentadienylsilane, tetracyclopentadienylsilane, monocyclopentadienylmonomethylsilane, monocyclopentadienylmonoethylsilane, monocyclopentadienyldimethylsilane, monocyclopentadienyldiethylsilane, monocyclopentadienyltrimethylsilane, monocyclopentadienyltriethylsilane, monocyclopentadienylmonomethoxysilane, monocyclopentadienylmonoethoxysilane, monocyclopentadienylmonophenoxysilane, dicyclopentadienylmonomethylsilane, dicyclopentadienylmonoethylsilane, dicyclopentadienyldimethylsilane, dicyclopentadienylmethylethylsilane, dicyclopentadienyldipropylsilane, dicyclopentadienylethylpropylsilane, dicyclopentadienyldiphenylsilane, dicyclopentadienylphenylmethylsilane, dicyclopentadienylmonomethoxysilane, dicyclopentadienylmonoethoxysilane, tricyclopentadienylmonomethylsilane, tricyclopentadienylmonoethylsilane, tricyclopentadienylmonomethoxysilane, tricyclopentadienylmonoethoxysilane, 3-methylcyclopentadienylsilane, bis-3-methylcyclopentadienylsilane, 3-methylcyclopentadienylmethylsilane, 1,2-dimethylcyclopentadienylsilane, 1,3-dimethylcyclopentadienylsilane, 1,2,4-trimethylcyclopentadienylsilane, 1,2,3,4-tetramethylcyclopentadienylsilane, pentamethylcyclopentadienylsilane, monoindenylsilane, diindenylsilane, triindenylsilane, tetraindenylsilane, monoindenylmonomethylsilane, monoindenylmonoethylsilane, monoindenyldimethylsilane, monoindenyldiethylsilane, monoindenyltrimethylsilane, monoindenyltriethylsilane, monoindenylmonomethoxysilane, monoindenylmonoethoxysilane, monoindenylmonophenoxysilane, diindenylmonomethylsilane, diindenylmonoethylsilane, diindenyldimethylsilane, diindenyldiethylsilane, diindenylmethylethylsilane, diindenyldipropylsilane, diindenylethylpropylsilane, diindenyldiphenylsilane, diindenylphenylmethylsilane, diindenylmonomethoxysilane, diindenylmonoethoxysilane, triindenylmonomethylsilane, triindenylmonoethylsilane, triindenylmonomethoxysilane, triindenylmonoethoxysilane, 3-methylindenylsilane, bis-3-methylindenylsilane, 3-methylindenylmethylsilane, 1,2-dimethylindenylsilane, 1,3-dimethylindenylsilane, 1,2,4-trimethylindenylsilane, 1,2,3,4-tetramethylindenylsilane, pentamethylindenylsilane and the like.

There may also be used certain compounds of the above which are bonded through alkylene groups having typically 2–8, preferably 2–3 carbon atoms, examples of which include bisindenylethane, bis(4,5,6,7-tetrahydro-1-indenyl)-ethane, 1,3-propylene-bis-indene, 1,3-propylene bis(4,5,6,7-tetrahydro)indene, propylene bis(1-indene), isopropyl(1-indenyl)cyclopentadiene, diphenylmethylene(9-fluorenyl) cyclopentadiene, isopropylcyclopentadienyl-1-fluorene and the like.

The catalyst component of the invention is derived by mutual contact of Compounds (A), (B) and (C) in a molar ratio (A):(B) of 1:0.01–100, preferably 1:0.1–10, and in a molar ratio (A):(C) of 1:0.01–100, preferably 1:0.1–10, respectively. The sequence in which the three compounds are contacted with one another is optional. However, it has been found preferable to bring Compound (A) and (C) into contact with each other in advance, followed by contact with Compound (B). There is no particular restriction upon the manner in which the three compounds are contacted. They may be contacted in an atmosphere of inert gas such as nitrogen or argon in the presence of a solvent of inert hydrocarbon such as heptane, hexane, benzene, toluene or xylene, at a temperature of about −100°–200° C., preferably −50°–100° C. for a duration of 30 minutes to 50 hours, preferably 2–24 hours. The resulting catalyst component can be readily put to use in the form of a solution, or can alternatively be used after it is solidified by suitable means and removed from the solution.

The inventive catalyst component is usually combined with a suitable promoter to form a catalyst composition for use in the homo- or co-polymerization of olefins. Such a promoter may be typically a modified organoaluminum compound or other commercially available promoter compounds which do not adversely affect the performance of the inventive catalyst component.

The term modified organoaluminum compound is used herein to designate a reaction product of an organoaluminum compound and water which has 1–100, preferably 1–50 Al—O—Al groups in the molecule. This reaction is usually conducted in the presence of an inert hydrocarbon such as pentane, hexane, heptane, cyclohexane, methylcyclohexane, benzene, toluene and xylene, of which aliphatic and aromatic hydrocarbons are preferred. The starting organoaluminum compound may be represented by the formula

$R_nAlX_{3-n}$ where R is an alkyl, alkenyl, aryl or aralkyl group having a carbon number of 1–18, preferably 1–12; X is a hydrogen or halogen atom, and n is an integer of $1 \leq n \leq 3$.

The above compound is typically exemplified by trialkylaluminum having an alkyl group optionally such as methyl, ethyl, propyl, isopropyl, butyl, isobutyl, pentyl, hexyl, octyl, decyl and dodecyl groups, of which methyl group is particularly preferred.

The water/organoaluminum reaction takes place in a molar ratio of water:Al in the range of 0.25:1–1.2/1, preferably 0.5:1–1/1 at a temperature of usually −70°–100° C., preferably −20°–20° C. for a period of 5–24 hours, preferably 5–10 hours. As water for reaction with the organoaluminum compound, there may be used crystal water contained in hydrates of copper sulfate or aluminum sulfate.

The catalyst component and the modified organoaluminum compound may be supplied separately or as an admixture to the polymerization reaction system. They are used in a ratio such that the atomic ratio of aluminum in the organoaluminum compound to transition metal in the catalyst component remain in the range of 1–100,000, preferably 5–1,000.

The term olefins as used herein designates alpha-olefins, cyclic olefins, dienes, trienes and styrene analogs. Alpha-olefins have a carbon number of 2–12, preferably 2–8 and typically include ethylene, propylene, 1-butene, 1-hexene and 4-methyl-1-pentene. According to the invention, these olefins may be homopolymerized or copolymerized such as by alternating, random or block copolymerization process.

The copolymerization of alpha-olefins is carried out in any of the combinations of ethylene and alpha-olefins of 3–12, preferably 3–8 carbon atoms such as ethylene/propylene, ethylene/1-butene, ethylene/1-hexene and ethylene/4-methyl-1-pentene, and propylene and alpha-olefins of 3–12, preferably 3–8 carbon atoms such as propylene/1-butene, propylene/4-methyl-1-pentene, propylene/4-methylbutene-1, propylene/1-hexane and propylene/1-octene. Alpha-olefins to be combined with ethylene and propylene respectively are used in an amount not exceeding 90 mol % of total monomers, e.g less than 40 mol %, preferably less than 30 mol %, more preferably less than 20 mol % with ethylene copolymers, and 1–90 mol %, preferably 5–90 mol %, more preferably 10–70 mol % with propylene copolymers.

The cyclic olefins to be used in the invention are those having a carbon number of 3–24, preferably 3–18 such as for example cyclopentene, cyclobutene, cyclohexene, 3-methylcyclohexene, cyclooctane, cyclodecene, cyclododecene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene and ethylenenorbornene. These cyclic olefins are usually copolymerized with alpha-olefins, in which instance the cyclic olefin is present in an amount of less than 50 mol %, preferably 1–50 mol %, more preferably 2–50 mol %, obtained.

The term dienes and trienes as used herein designates a polyene having 4 to 26 carbons and having two or three double bonds which may be conjugated or unconjugated.

Specific examples of the above polyene include butadiene, 1,4-hexadiene, 1,5-hexadiene, 1,9-decadiene, 1,13-tetradecadiene, 2,6-dimethyl-1, 5-heptadiene, 2-methyl-2,7-octadiene, 2,7-dimethyl-2, 6-octadiene and 1,5,9-decatriene. These polyenes are usually copolymerized with the above-listed alpha-olefins, and their contents in the resultant copolymers remain in the range of 0.1–50 mol %, preferably 0.2–10 mol %.

The term styrene analogs as referred to herein designates styrene and derivatives thereof including t-butylstyrene, alpha-methylstyrene, p-methylstyrene, divinylbenzene, 1,1-diphenylethylene, N,N-dimethyl-p-aminoethylstyrene and N,N-dimethyl-p-aminoethylstyrene.

The catalyst composition provided in accordance ,with the invention is suitably used for the homo- or co-polymerization of olefins and further for reforming the homopolymers or copolymers with use of certain polar monomers. Such polar monomers may be unsaturated carboxylic acid esters exemplified by methylacrylate, methylmethacrylate, butylmethacrylate, dimethylmaleate, diethylmaleate, monomethylmaleate, diethylfumarate and dimethylitaconate. The polar monomer contents in the reformed copolymer obtained are usually in the range of 0.1–10 mol %, preferably 0.2–2 mol %.

The polymerization reaction according to the invention is conducted in a slurry, solution or gas phase in the presence or absence of an inert hydrocarbon solvent such as an aliphatic hydrocarbon including hexane and heptane, an aromatic hydrocarbon including benzene, toluene and xylene, and an alicyclic hydrocarbon including cyclohexane, and methylcyclohexane, substantially without the presence of oxygen and water, at a temperature of 20°–200° C., preferably 50°–100° C. under a pressure of atmospheric –70 kg/cm$^2$G, preferably atmospheric –20 kg/cm$^2$G, for a time length of 5 minutes to 10 hours, preferably 5 minutes to 5 hours.

Whilst the molecular weight of the polymer product obtained may be adjusted to some extent by varying the polymerization temperature, the molar ratio of the catalyst and other polymerization parameters, it can be more effectively adjusted by introducing water into the reaction system.

Preparation of Modified Organoaluminum Compound (Methylalumoxane)

In a 300-ml three-necked flask equipped with an electromagnetic stirrer were placed 13 grams of copper sulfate hydrate and 50 ml of toluene. The mixture after being suspended was incorporated dropwise at 0° C. and over 2 hours with 150 ml of a 1 mmol/ml trimethylaluminum solution. The reaction was effected at 25° C. for 24 hours. Filtration of the reaction mixture and subsequent evaporation of excess toluene gave 4 grams of methylalumoxane (MAO) in the form of a white crystal.

Each of the polymers obtained in the respective Inventive and Comparative Examples given below was tested for the following items of property.

Melt Index (MI)

The procedure of ASTM D1238-57T was followed.

Density (D)

The procedure of ASTM D1505-68 was followed.

Melting Point by Calorimetry (DSC)

5 mg of the polymer sample was disposed at 180° C. for 3 minutes, cooled to 0° C. over 10° C./min and allowed to stand at 0° C. for 10 minutes, followed by heating with a temperature rise of 10° C./min with use of a melting point tester (Seiko Electronics DSC-20).

Molecular Weight Distribution (Mw/Mn)

This was measured by a gel permeation chromatography (Model 150-C manufactured by Waters Co.) at 135° C. with use of ortho-dichlorobenzene as solvent.

The invention will now be further described by way of the following examples.

INVENTIVE EXAMPLE 1

Preparation of Catalyst Component A01

Into a 300-ml three-necked flask were introduced 100 ml of toluene, followed by addition of 11 grams of triethylaluminum (AlEt$_3$) and 2.6 grams of cyclopentadiene. The admixture was cooled to –60° C. 50 ml of toluene were fed into a separate 100-ml flask, followed by addition of 4.2 grams of tetrapropoxyzirconium (Zr(OPr)$_4$) and 1.0 gram of cyclopentadiene. The resulting solution was admixed with the previously obtained admixture, and the whole was stirred at –60° C. for one hour and slowly heated with stirring until there was produced a black solution of Catalyst Component A01. The operation was conducted thoroughly in nitrogen atmosphere.

Polymerization

A 3-liter stainless steel autoclave equipped with stirrer was purged with nitrogen and thereafter supplied with 300 ml of toluene, 3.6 ml of 1,5-hexadiene, 2 ml of 1 mmol/ml methylalumoxane solution and 0.2 mg of Catalyst Component A01 in terms of the Zr element. Ethylene was charged to bring the autoclave internal pressure up to 9 kg/cm$^2$G, whereupon the polymerization reaction was initiated at 30° C. and continued for 6 hours with continued charge of ethylene to maintain the reaction system at 9 kg/cm$^2$G.

Upon completion of the reaction, all excess gases were removed from the reactor which was then cooled to obtain an ethylene/1,5-hexadiene copolymer in an amount of 30 grams. The resulting copolymer had an ethylene content of 98.2 mol %, a density of 0.9236 g/cm$^3$ and a melting point of 138° C. Catalytic activity was represented by 150,000 grams copolymer/gram Zr.

INVENTIVE EXAMPLE 2

Preparation of Catalyst Component A02

Into a 300-ml three-necked flask were introduced 100 ml of toluene, followed by addition of 11 grams of triethylaluminum (AlEt$_3$) and 4.8 grams of bis-indenylethane. The admixture was cooled to –60° C. 50 ml of toluene were fed into a separate 100-ml flask, followed by addition of 4.5 grams of tetrabutoxyzirconium (Zr(OBu)$_4$) and 1.2 grams of bis-indenylethane. The resulting solution was admixed with the previously obtained admixture, and the whole was stirred at –60° C. for one hour and slowly heated with stirring until there was produced a black solution of Catalyst Component A02. The operation was conducted thoroughly in nitrogen atmosphere.

Polymerization

A 3-liter stainless steel autoclave equipped with stirrer was purged with nitrogen and thereafter supplied with 300 ml of toluene, 5.5 ml of 1 mmol/ml methylalumoxane solution and 0.5 mg of Catalyst Component A02 in terms of the Zr element. Ethylene was charged to bring the autoclave internal pressure up to 9 kg/cm$^2$G, whereupon the polymerization reaction was initiated at 30° C. and continued for 15 minutes with continued charge of ethylene to maintain the reaction system at 9 kg/cm$^2$G. Into the reaction product were thereafter fed 54 ml of methyl methacrylate, and the whole was further polymerized at 30° C. for 3 hours with ethylene continuously charged to maintain the reaction system at 9 kg/cm$^2$G.

Upon completion of the reaction, excess gas was removed from the reactor which was then cooled to yield 30 grams of a polymer. After being dissolved in toluene, the resulting polymer was precipitated with addition of acetone and then dried. The polymer thus treated was press-molded into a 25-micron thick sheet (190° C.×5 min). Infrared spectrometry of the sheet showed at 1740 cm$^{-1}$ an absorption spectrum peculiar to a carbonyl group. The polymer produced in this example was determined to have a molecular weight distribution (rw/Mtn) of 4.7 (GPC) and an intrinsic viscosity of 1.9 dl/g (135° C. tetralin). Catalytic activity was represented by 20,000 grams polymer/gram Zr.

INVENTIVE EXAMPLE 3

Polymerization

A 3-liter stainless steel autoclave equipped with stirrer was purged with nitrogen and thereafter supplied with 300 ml of toluene, 10.0 ml of 1 mmol/ml methylalumoxane solution and 1.0 mg of Catalyst Component A02 in terms of the Zr element. The admixture was heated at 50° C. with stirring. The polymerization was initiated with a charge of a gas mixture propylene/1-butene (propylene 85 mol %/1-butene 15 mol %) to bring the reactor pressure up to 5 kg/cm$^2$G and continued for 2 hours with continued charge of the gas mixture to maintain that pressure.

Upon completion of the reaction, all excess gases were removed, followed by addition of methanol to cause the reaction product to precipitate. The precipitate was washed with methanol and dried to yield 60 grams of a copolymer. The resulting copolymer had a 1-butene content of 10.5 mol % ($^{13}$C-MNR), a molecular weight distribution (Mw/Mn) of 4.0 (GPC) and an intrinsic viscosity of 0.83 dl/g (135° C. tetralin). Catalytic activity was represented by 60,000 grams copolymer/gram Zr.

INVENTIVE EXAMPLE 4

Polymerization

A 3-liter stainless steel autoclave equipped with stirrer was purged with nitrogen and thereafter supplied with 300 ml of toluene, 5.0 ml of cyclopentene, 50.0 ml of 1 mmol/ml methylalumoxane solution and 1.0 mg of Catalyst Component A02 in terms of the Zr element. The admixture was reacted at 30° C. for 24 hours. Ethylene was charged to bring the autoclave internal pressure up to 3.5 kg/cm$^2$G, whereupon the polymerization reaction was initiated at 30° C. and continued for one hour with continued charge of ethylene to maintain the reaction system at 3.5 kg/cm$^2$G.

Upon completion of the reaction, all excess gases were removed, followed by addition of methanol to cause the reaction product to precipitate. The precipitate was washed with methanol and dried to yield 36 grams of a copolymer. The resulting copolymer had an ethylene content of 98.0 mol % ($^{13}$C-MNR), a molecular weight distribution (Mw/Mn) of 4.4 (GPC) and an intrinsic viscosity of 1.3 dl/g (135° C. tetralin). Catalytic activity was represented by 12,000 grams copolymer/gram Zr.

INVENTIVE EXAMPLE 5

Preparation of Catalyst Component A03

Into a 300-ml three-necked flask were introduced 100 ml of toluene, followed by addition of 12.5 grams of triethylaluminum (AlEt$_3$) and 4.6 grams of indene. The admixture was cooled to -60° C. 50 ml of toluene were fed into a separate 100-ml flask, followed by addition of 4.5 grams of tetrapropoxyzirconium (Zr(OPr)$_4$) and 1.8 grams of indene. The resulting solution was admixed with the previously obtained admixture, and the whole was stirred at -60° C. for one hour and slowly heated with stirring up to 20° C. over 2 hours. The reaction was continued with stirring at 45° C. for 3 hours until there was obtained a black solution.

Into a 300-ml three-necked flask were 50 ml of 2 mmol/g toluene solution of methylalumoxane and 2.7 ml of the black solution prepared above. The resulting solution was stirred, followed by gradual addition of 150 ml of n-hexane to cause precipitation. Subsequent filtration and in vacuo drying of the precipitate gave Catalyst Component A03 in solid form.

Prepolymerization

A 3-liter stainless steel autoclave equipped with stirrer was purged with nitrogen and then incorporated with 100 ml of n-hexane and 2 grams of Catalyst Component A03. Ethylene was charged into the admixture, whereupon the whole was prepolymerized at 0.5 kg/cm$^2$G and at normal temperature for 30 minutes.

Polymerization

A 3-liter stainless steel autoclave equipped with stirrer was purged with nitrogen and thereafter supplied with 200 grams of sodium chloride (anhydrous), 5.5 ml of 1 mmol/ml isobutylalumoxane solution derived by reacting isobutylaluminum and water (Al:H$_2$O=1:0.5) and 0.14 gram of the above prepolymer. The admixture was heated at 60° C. with stirring. The polymerization was initiated with a charge of ethylene to bring the reactor pressure up to 9 kg/cm$^2$G and continued for one hour with continued charge of the gas to maintain that pressure.

Upon completion of the reaction, excess gas was removed from the reactor which was then cooled to obtain 25 grams of a white polymer. The resulting polymer had a melt index (MI) of 2.3 g/10 min and a molecular weight distribution (Mw/Mn) of 4.3.

INVENTIVE EXAMPLE 6

Preparation of Catalyst Component A04

Into a 300-ml three-necked flask were introduced 100 ml of toluene, followed by addition of 12.5 grams of triethylaluminum (AlEt$_3$) and 5.4 grams of monocycloindenyltrimethylsilane. The admixture was cooled to -60° C. 50 ml of toluene were fed into a separate 100-ml flask, followed by addition of 4.2 grams of tetrabutoxyzirconium (Zr(OBu)$_4$) and 2.1 grams of monocycloindenyltrimethylsilane. The resulting solution was admixed with the above cold admixture, and the whole was stirred at -60° C. for one hour and heated slowly with stirring until there was produced a black solution of Catalyst Component A04. The resultant solution had a Zr content of 0.1 mmol/ml. The operation was conducted in nitrogen atmosphere.

Polymerization

A 3-liter stainless steel autoclave equipped with stirrer was purged with nitrogen and thereafter supplied with 200 grams of sodium chloride (anhydrous), 0.2 ml of Catalyst Component A04 and 20 ml of 1 mmol/ml methylalumoxane solution. The admixture was heated at 60° C. with stirring. The polymerization was initiated with a charge of a gas mixture ethylene/1-butene (1-butene/ethylene mol ratio= 0.25) to bring the reactor pressure up to 9 kg/cm$^2$G and continued for one hour with continued charge of the gas mixture (1-butene/ethylene mol ratio=0.05) to maintain that pressure.

Upon completion of the reaction, all excess gases were removed from the reactor which was then cooled to obtain 129 grams of a white copolymer. The resulting copolymer had a melt index (MI) of 2.3 g/10 min, a molecular weight distribution (Mw/Mn) of 5.2 and a density of 0.9238. Catalytic activity was represented by 72,000 grams copolymer/gram Zr.

INVENTIVE EXAMPLE 7

Preparation of Catalyst Component A05

Into a 300-ml three-necked flask were introduced 100 ml of toluene, followed by addition of 9.7 grams of ethylmagnesium chloride (EtMgCl) in tetrahydrofuran and 4.6 grams of indene. The admixture was cooled to -60° C. 50 ml of toluene were fed into a separate 100-ml flask, followed by addition of 4.2 grams of tetrapropoxyzirconium (Zr(OPr)$_4$) and 1.8 grams of indene. The resulting solution was poured over 20 minutes into the above cold admixture, and the whole was stirred at −60° C. for one hour and heated slowly with stirring up to 20° C. over 2 hours. By subsequent reaction with stirring at 45° C. for 3 hours, there was produced a solution of Catalyst Component A05 in which Zr was contained in a concentration of 5.4 mg/ml. The operation was conducted in nitrogen atmosphere.

Polymerization

A 3-liter stainless steel autoclave equipped with stirrer was purged with nitrogen and thereafter supplied with 200 grams of sodium chloride (anhydrous), 0.28 ml of Catalyst Component A05 and 16 ml of 1 mmol/l methylalumoxane solution. The admixture was heated at 60° C. with stirring. The polymerization was initiated with a charge of a gas mixture ethylene/1-butene (1-butene/ethylene mol ratio= 0.25) to bring the reactor pressure up to 9 kg/cm$^2$G and continued for one hour with continued charge of the gas mixture (butene-1/ethylene mol ratio=0.05) to maintain that pressure.

Upon completion of the reaction, all excess gases were removed from the reactor which was then cooled to yield 100 grams of a white copolymer.

INVENTIVE EXAMPLES 8–25

Preparation of Catalyst Components A06 to A22

Catalyst Components A06 to A22 were obtained, as was done in A05, with the varied compositions shown in Table 1.

Tetrabenzylzirconium (ZrBz$_4$) employed for A14 and A22 was prepared by the following mode of synthesis.

Into an 1-liter three-necked flask equipped with magnetic stirrer were fed, at 0° C. and in nitrogen atmosphere, 500 ml of diethyl ether solution containing 70 grams of benzylmagnesium chloride, followed by addition of 30 grams of zirconium tetrachloride over 30 minutes in nitrogen atmosphere. The admixture was heated with stirring for 2 hours up to room temperature, followed by addition of 300 ml of decalin and by subsequent stirring for one hour at room temperature. Magnesium chloride having been formed was isolated from the reaction product. The resulting decalin solution was heated at 50° C. to remove ether with continued blowing of nitrogen, thereby obtaining 32 grams of ZrBz$_4$.

Polymerization

The method of Inventive Example 7 was followed except that A06 to A22 were used respectively in place of A05. Ethylene and propylene were homopolymerized respectively in Inventive Examples 23 and 24.

Table 2 shows the details of the catalyst components of Inventive Examples 8 to 25 and the physical properties of the resultant polymers.

Comparative Examples 1–10

Preparation of Catalyst Component B01

Into a 300-ml three-necked flask were fed 100 ml of toluene, followed by addition of 4.2 grams of tetrapropoxyzirconium (Zr(OPr)$_4$). The admixture was stirred at room temperature to obtain Catalyst Component B01.

Preparation of Catalyst Components B02 to B04

The method for B01 was followed except that tetrabenzylzirconium (ZrBz$_4$), tetrachlorozirconium (ZrCl$_4$) and dicyclopentadienyl dichlorozirconium (Cp$_2$ZrCl$_2$) were substituted respectively for Zr(OPr)$_4$. There were thus obtained Catalyst Components B02 to B04.

Preparation of Catalyst Components B05 to B07

The method for A05 was followed except that without use of the tetrahydrofuran solution of ethylmagnesium chloride, zirconium compounds and indene were reacted with varying mol ratios as shown in Table 3. There were thus obtained Catalyst Components B05 to B07.

Preparation of Catalyst Components B08 to B10

The method for A05 was followed except that with indene omitted, zirconium compounds and ethylmagnesium chloride were reacted varying mol ratios as shown in Table 3. There were thus obtained Catalyst Components B08 to B10.

Polymerization

The method of Inventive Example 7 was followed except that B01 to B10 were used respectively in place of A05.

Table 4 shows the details of the catalyst components of Comparative Examples 1 to 10 and the physical properties of the resultant polymers.

INVENTIVE EXAMPLE 26

Preparation of Catalyst Component A23

Into a 300-ml three-necked flask were introduced 100 ml of toluene, followed by addition of 12.5 grams of AlEt$_3$ and 4.6 grams of indene. The admixture was cooled to −60° C. 50 ml of toluene were fed into a separate 100-ml flask, followed by addition of 4.2 grams of Zr(OPr)$_4$ and 1.8 grams of indene. The resulting solution was admixed over 20 minutes with the previously obtained admixture, and the whole was stirred at −60° C. for one hour and heated slowly with stirring up to 20° C. over 2 hours. By subsequent reaction with stirring at 45° C. for 3 hours, there was produced a black solution of Catalyst Component A23. Its Zr content was 0.075 mmol/ml.

Polymerization

A 3-liter stainless steel autoclave equipped with stirrer was purged with nitrogen and thereafter supplied with 200 grams of sodium chloride (anhydrous), 0.2 ml of Catalyst Component A23 and 15 ml of 1 mmol/ml methylalumoxane solution. The admixture was heated at 60° C. with stirring. The polymerization was initiated with a charge of a gas mixture ethylene/1-butene (1-butene/ethylene mol ratio= 0.25) to bring the reactor pressure up to 9 kg/cm$^2$G and continued for one hour with continued charge of the gas mixture (1-butene/ethylene mol ratio=0.05) to maintain that pressure.

INVENTIVE EXAMPLE 27

Preparation of Catalyst Component A24

The method for A23 was followed except that the amount of Zr(OPr)$_4$ was doubled. A black solution of Catalyst Component A24 was obtained with a Zr content of 0.15 mmol/ml.

19

Polymerization

The method of Inventive Example 26 was followed except that 0.1 mol of A24 was used in place of A23.

INVENTIVE EXAMPLE 28

Polymerization

The method of Inventive Example 26 was followed except that the amount of methylalumoxane was halved.

INVENTIVE EXAMPLE 29

Preparation of Catalyst Component A25

The method for A23 was followed except that 4.4 grams of tetrabutoxytitanium (Ti(OBu)$_4$) were used in place of Zr(OPr)$_4$. A solution of Catalyst Component A25 was obtained with a Ti content of 0.075 mmol/ml.

Polymerization

The method of Inventive Example 26 was followed except that A25 was substituted for A23.

Inventive Examples 30–36

Preparation of Catalyst Component A26

The method for A23 was followed except that 5 grams of Zr(OBu)$_4$ were used in place of Zr(OPr)$_4$. A solution of Catalyst Component A26 was obtained with a Zr content of 0.075 mmol/ml.

Preparation of Catalyst Component A27

The method for A23 was followed except that 13.1 grams of AlEt$_2$Cl were used in place of AlEt$_3$.

Preparation of Catalyst Component A28

The method for A23 was followed except that 9.1 grams of fluorene were used in place of indene.

Preparation of Catalyst Component A29

The method for A23 was followed except that 5.7 grams of cyclooctatetraene were used in place of indene.

Preparation of Catalyst Component A30

The method for A23 was followed except that Zr(OPr)$_4$ was replaced with 10.8 grams of tetrapropoxyhafnium (Hf(OPr)$_4$).

Preparation of Catalyst Component A31

The method for A23 was followed except that Zr(OPr)$_4$ was replaced with 3.9 grams of tripropoxyzirconium chloride (Zr(OPr)$_3$Cl).

Preparation of Catalyst Component A32

Into a 300-ml three-necked flask were introduced 150 ml of toluene, 4.2 grams of Zr(OPr)$_4$ and 6.4 grams of indene. The admixture was stirred at room temperature for one hour, followed by addition of 12.5 grams of AlEt$_3$ over 20 minutes, and the whole was reacted at 45° C. for 3 hours. There was produced a solution of Catalyst Component A32.

Polymerization

The method of Inventive Example 26 was followed except that A26 to A32 were substituted respectively for A23.

20

INVENTIVE EXAMPLE 37

Polymerization

The method of Inventive Example 26 was followed except that ethylene was homopolymerized.

Comparative Examples 11–14

Preparation of Catalyst Component B11

As Catalyst component B11, toluene solution of Zr(OPr)$_4$ was prepared to have a Zr content of 0.08 mmol/ml.

Preparation of Catalyst Component B12

The method for A23 was followed except that indene was omitted.

Preparation of Catalyst Component B13

The method for A23 was followed except that AlEt$_3$ was omitted. A solution of Catalyst Component B13 was obtained with a Zr content of 0.08 mmol/ml.

Preparation of Catalyst Component B14

As Catalyst component B14, toluene solution of Cp$_2$ZrCl$_2$ was prepared to have a Zr content of 0.07 mmol/ml.

Polymerization

The method of Inventive Example 26 was followed except that B11 to B14 were substituted respectively for A23.

Table 5 shows the compositions of Catalyst Components to A32 and B11 to B14. Listed in Table 6 are the polymerization conditions used in Inventive Examples 26 to 37 and Comparative Examples 11 to 14 together with the physical properties of the resultant polymers.

TABLE 1

| catalyst component | catalyst composition | | | mol ratio (A):(B):(C) |
|---|---|---|---|---|
| | (A) | (C) | (B) | |
| A05 | Zr(OPr)$_4$ | indene | EtMgCl | 1:4:8 |
| A06 | Zr(OPr)$_4$ | indene | Et$_2$Zn | 1:4:8 |
| A07 | Zr(OPr)$_4$ | indene | Et$_3$B | 1:4:8 |
| A08 | Zr(OPr)$_4$ | indene | EtMgCl | 1:2:4 |
| A09 | Ti(OBu)$_4$ | indene | EtMgCl | 1:2:4 |
| A10 | Hf(OPr)$_4$ | indene | PhMgCl | 1:3:10 |
| A11 | Zr(OPr)$_3$Cl | fluorene | EtMgCl | 1:1:2 |
| A12 | Zr(OPr)$_4$ | cyclooctatetraene | EtMgCl | 1:4:10 |
| A13 | ZrAy$_4$ | indene | AlEt$_2$Cl | 1:4:8 |
| A14 | ZrBz$_4$ | indene | AlEt$_2$(OEt) | 1:4:8 |
| A15 | ZrNp$_4$ | indene | EtMgCl | 1:4:8 |
| A16 | ZrCl$_4$ | indene | EtLi | 1:3:6 |
| A17 | ZrCl$_4$ | indene | EtMgCl | 1:4:8 |
| A18 | TiCl$_4$ | indene | EtMgCl | 1:4:8 |
| A19 | ZrCl$_4$ | fluorene | EtMgCl | 1:4:8 |
| A20 | Zr(OPr)$_4$ | indene | BuMgCl | 1:2:8 |
| A21 | Zr(OPr)$_4$ | bis-indenylethane | BuMgCl | 1:2:8 |
| A22 | ZrBz$_4$ | indene | Al(OEt)$_2$Cl | 1:2:10 |

Notes:
Et = ethyl
Bu = n-butyl
Bz = benzyl
Pr = n-propyl
Ay = allyl
Ph = phenyl
Np = neophil

TABLE 2

| Inventive Example | catalyst component | M (mg) | yield (g) | CA (g/gMe) | Mw/Mn | MI (g/10 min) | density (g/cm$^3$) | mp (°C.) |
|---|---|---|---|---|---|---|---|---|
| 7 | A05 | 1.5 | 100 | 67,000 | 5.9 | 0.8 | 0.9231 | 114.7 |
| 8 | A06 | 1.6 | 101 | 53,000 | 5.3 | 0.7 | 0.9250 | 115.4 |
| 9 | A07 | 1.4 | 83 | 59,000 | 5.5 | 1.0 | 0.9244 | 115.1 |
| 10 | A08 | 1.7 | 117 | 69,000 | 6.0 | 0.6 | 0.9241 | 115.1 |
| 11 | A09 | 2.0 | 78 | 39,000 | 4.8 | 0.4 | 0.9220 | 114.3 |
| 12 | A10 | 2.3 | 67 | 29,000 | 4.9 | 0.1 | 0.9215 | 113.8 |
| 13 | A11 | 1.4 | 67 | 48,000 | 5.4 | 0.8 | 0.9233 | 114.8 |
| 14 | A12 | 1.5 | 76.5 | 51,000 | 4.4 | 0.7 | 0.9211 | 113.8 |
| 15 | A13 | 1.5 | 102 | 68,000 | 7.2 | 0.6 | 0.9235 | 114.8 |
| 16 | A14 | 1.6 | 110 | 69,000 | 6.2 | 0.5 | 0.9274 | 115.7 |
| 17 | A15 | 1.7 | 107 | 63,000 | 3.4 | 0.7 | 0.9218 | 113.9 |
| 18 | A16 | 1.3 | 87 | 67,000 | 3.3 | 0.8 | 0.9222 | 113.9 |
| 19 | A17 | 1.5 | 97.5 | 65,000 | 3.3 | 0.9 | 0.9233 | 114.8 |
| 20 | A18 | 2.1 | 71 | 34,000 | 3.1 | 0.3 | 0.9210 | 113.7 |
| 21 | A19 | 1.8 | 72 | 40,000 | 5.9 | 0.4 | 0.9265 | 115.5 |
| 22 | A20 | 1.5 | 73.5 | 49,000 | 15.0 | 3.0 | 0.9239 | 115.0 |
| 23 | A20 | 1.4 | 88 | 63,000 | 5.8 | 0.08 | 0.9510 | 135.3 |
| 24 | A21 | 3.0 | 117 | 39,000 | 3.9 | 1.3 | 0.9038 | 141.1 |
| 25 | A22 | 1.8 | 86 | 48,000 | 4.7 | 1.0 | 0.9213 | 113.9 |

Notes:
M = transition metal
CA = catalytic activity

TABLE 3

| catalyst component | catalyst composition | | | mol ratio |
|---|---|---|---|---|
| | (A) | (C) | (B) | (A):(C):(B) |
| B01 | Zr(OPr)$_4$ | — | — | 1:0:0 |
| B02 | ZrBz$_4$ | — | — | 1:0:0 |
| B03 | ZrCl$_4$ | — | — | 1:0:0 |
| B04 | Cp$_2$ZrCl$_2$ | — | — | 1:0:0 |
| B05 | Zr(OPr)$_4$ | indene | — | 1:4:0 |
| B06 | ZrBz$_4$ | indene | — | 1:4:0 |
| B07 | ZrCl$_4$ | indene | — | 1:4:0 |
| B08 | Zr(OPr)$_4$ | — | EtMgCl | 1:0:8 |
| B09 | ZrBz$_4$ | — | EtMgCl | 1:0:8 |
| B10 | ZrCl$_4$ | — | EtMgCl | 1:0:8 |

Notes:
Py = n-propyl
Bz = benzyl
Cp = cyclopentadienyl

TABLE 5

| catalyst component | catalyst composition | | | mol ratio |
|---|---|---|---|---|
| | (A) | (C) | (B) | (A):(C):(B) |
| A23 | Zr(OPr)$_4$ | indene | AlEt$_3$ | 1:4:8 |
| A24 | Zr(OPr)$_4$ | indene | AlEt$_3$ | 1:2:4 |
| A25 | Ti(OBu)$_4$ | indene | AlEt$_3$ | 1:4:8 |
| A26 | Zr(OBu)$_4$ | indene | AlEt$_3$ | 1:4:8 |
| A27 | Zr(OPr)$_4$ | indene | AlEt$_2$Cl | 1:4:8 |
| A28 | Zr(OPr)$_4$ | fluorene | AlEt$_3$ | 1:4:8 |
| A29 | Zr(OPr)$_4$ | cycloocta-tetraene | AlEt$_3$ | 1:2:4 |
| A30 | Hf(OPr)$_4$ | indene | AlEt$_3$ | 1:2:4 |
| A31 | Zr(OPr)$_4$ | indene | AlEt$_3$ | 1:4:8 |
| A32 | Zr(OPr)$_3$Cl | indene | AlEt$_3$ | 1:4:8 |
| B11 | Zr(OPr)$_4$ | — | — | — |
| B12 | Zr(OPr)$_4$ | — | AlEt$_3$ | 1:0:8 |

TABLE 4

| Comparative Example | catalyst component | M (mg) | yield (g) | CA (g/gMe) | Mw/Mn | MI (g/10 min) | density (g/cm$^3$) | mp (°C.) |
|---|---|---|---|---|---|---|---|---|
| 1 | B01 | 1.3 | — | — | — | — | — | — |
| 2 | B02 | 1.5 | trace | — | — | — | — | — |
| 3 | B03 | 1.4 | — | — | — | — | — | — |
| 4 | B04 | 1.5 | 63 | 45,000 | 2.6 | 23 | 0.9198 | 106.7 |
| 5 | B05 | 1.6 | 21 | 13,000 | 5.1 | 1.45 | 0.9281 | 115.3 |
| 6 | B06 | 1.5 | 45 | 30,000 | 7.8 | 0.95 | 0.9224 | 114.3 |
| 7 | B07 | 1.4 | — | — | — | — | — | — |
| 8 | B08 | 1.6 | — | — | — | — | — | — |
| 9 | B09 | 1.7 | 33 | 21,000 | 9.8 | 1.0 | 0.6264 | 115.0 |
| 10 | B10 | 1.4 | — | — | — | — | — | — |

Notes:
M = transition metal
CA = catalytic activity

TABLE 5-continued

| catalyst component | catalyst composition | | | mol ratio |
|---|---|---|---|---|
| | (A) | (C) | (B) | (A):(C):(B) |
| B13 | Zr(OPr)$_4$ | indene | — | 1:4:0 |
| B14 | Cp$_2$ZrCl$_2$ | — | — | — |

Notes:
Et = ethyl
Bu = n-butyl
Bz = benzyl
Pr = n-propyl
Ay = allyl
Ph = phenyl
Np = neophil

TABLE 6

| Example | | catalyst component solution, ml | MAO M mol ratio | yield (g) | catalytic activity (g/gMe) | MI (g/10 min) | density (g/cm$^3$) | DSC mp (°C.) | Mw/Mn |
|---|---|---|---|---|---|---|---|---|---|
| Inventive | 26 | A23 | 0.2 | 1,000 | 82 | 60,000 | 0.2 | 0.9210 | 114.0 | 5.1 |
| | 27 | A24 | 0.1 | 1,000 | 89 | 65,000 | 0.5 | 0.9220 | 116.3 | 4.6 |
| | 28 | A24 | 0.1 | 500 | 48 | 35,000 | 0.08 | 0.9196 | 113.0 | 4.5 |
| | 29 | A25 | 0.35 | 1,000 | 73 | 15,000 | 0.02 | 0.9242 | 118.3 | 4.2 |
| | 30 | A26 | 0.2 | 1,000 | 97 | 71,000 | 0.8 | 0.9202 | 113.5 | 4.3 |
| | 31 | A27 | 0.2 | 1,000 | 64 | 47,000 | 0.3 | 0.9284 | 117.1 | 7.1 |
| | 32 | A28 | 0.2 | 1,000 | 25 | 18,000 | 0.6 | 0.9216 | 114.3 | 8.2 |
| | 33 | A29 | 0.1 | 1,000 | 19 | 14,000 | 3.6 | 0.9203 | 104.5 | 4.1 |
| | 34 | A30 | 0.1 | 1,000 | 29 | 21,000 | 0.03 | 0.9208 | 112.3 | 4.6 |
| | 35 | A31 | 0.2 | 1,000 | 93 | 68,000 | 0.6 | 0.9209 | 113.1 | 4.6 |
| | 36 | A32 | 0.2 | 1,000 | 103 | 75,000 | 0.7 | 0.9211 | 114.2 | 6.2 |
| | 37 | A33 | 0.2 | 1,000 | 110 | 80,000 | 0.1 | 0.955 | 131.9 | 4.3 |
| Comparative | 11 | B11 | 0.2 | 1,000 | 0 | — | — | — | — | — |
| | 12 | B12 | 0.2 | 1,000 | 0 | — | — | — | — | — |
| | 13 | B13 | 0.2 | 1,000 | 19 | 13,000 | 1.45 | 0.9281 | 116.3 | 5.1 |
| | 14 | B14 | 0.2 | 1,000 | 57 | 25,000 | 23 | 0.9198 | 106.7 | 2.6 |

Notes:
MAO = methylalumoxane
M = transition metal

As appears clear from the data shown in the above tables, the catalyst components provided by the invention can afford significantly high catalytic activity per transition metal used. The inventive catalyst components when combined with suitable promoters provide a catalyst composition useful in the homo- or co-polymerization of alpha-olefins, resulting in polymer products having increased molecular weight and broad molecular weight distribution, with a relatively narrow composition distribution for the copolymers obtained. Such copolymers typically of ethylene or propylene with other alpha-olefins which are produced with the use of the inventive catalyst components can be formed into sheets or films of high transparency without encountering objectionable mutual adhesion. The catalyst composition comprising the inventive components provides copolymers for example of ethylene and dienes which have a relatively high melting point despite their relatively low density and further provides block copolymers of olefins and polar monomers which have a relatively broad molecular weight distribution.

What is claimed is:

1. A catalyst component for use in the polymerization of olefinic hydrocarbons, said catalyst component comprising:

(i) a compound (A) of the formula $$Ti(OR^1)_p R^2_q X^1_{4-p-q}$$

where $R^1$ and $R^2$ are independently hydrocarbon moieties of 1–24 carbon atoms selected from the group consisting of alkyl, alkenyl, aryl, and aralkyl group; $X^1$ is a halogen atom; $0 \leq p \leq 4$; $0 \leq q \leq 4$; and $0 \leq p+q \leq 4$;

(ii) a compound (B) of the formula $$M^2(OR^3)_m R^4_n X^2_{z-m-n}$$

where $R^3$ and $R^4$ are independently hydrocarbon moieties of 1–24 carbon atoms; $X^2$ is a halogen atom; $M^2$ is a metal of Groups Ia–IIIa or IIb of the Periodic Table; z is the valence of $M^2$; $0 \leq m \leq 3$; $0 \leq n \leq 3$; and $1 \leq n+m \leq 3$; and (iii) an organocyclic compound (C) having two or more conjugated double bonds and selected from the group consisting of indene, azulene, fluorene, hydrocarbyl-substituted cyclopentadiene, hydrocarbyl-substituted indene, hydrocarbyl-substituted azulene, and hydrocarbyl-substituted fluorene.

2. A catalyst component as claimed in claim 1 wherein said hydrocarbon moieties of compound (B) are selected from the group consisting of alkyl, alkenyl, aryl, and aralkyl groups.

3. A catalyst component as claimed in claim 1 wherein said $R^3$ and $R^4$ each are hydrocarbon moieties of 1–12 carbon atoms.

4. A catalyst component as claimed in claim 1 wherein said compounds (A), (B) and (C) are blended in a molar ratio of (A):(B) of 1:0.1 to 1:100 and in a molar ratio of (A):(C) of 1:0.1 to 1:100.

5. A catalyst component as claimed in claim 4 wherein said molar ratio of (A):(B) is 1:0.1 to 1:10.

6. A catalyst component as claimed in claim 4 wherein said molar ratio of (A):(C) is 1:0.1 to 1:10.

7. A catalyst component as claimed in claim 1 wherein said compound (A) is one selected from the group consisting of tetramethyltitanium, tetraethyltitanium, tetrabenzyltitanium, tetraethoxytitanium, tetraisopropoxytitanium and tetra-n-butoxytitanium.

8. A catalyst component as claimed in claim 1 wherein said total carbon number of each of said organocyclic compounds (C) is 4–12.

9. A catalyst component as claimed in claim 1 wherein said organocyclic compound (C) is selected from the group consisting of methylcyclopentadiene, ethylcyclopentadiene, t-butylcyclopentadiene, hexylcyclopentadiene, octylcyclopentadiene, 1,2-dimethylcyclopentadiene, 1,3- dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, azulene, ethylazulene, fluorene, methylfluorene, bisindenylethane, bis(4,5,6,7-tetrahydro-1-indenyl)ethane, 1,3-propylene bisindene, 1,3-propylene bis(4,5,6,7-tetrahydro)indene, propylene bis(1-indene), isopropyl(1-indenyl)cyclopentadiene, diphenylmethylene(9-fluorenyl)cyclopentadiene, and isopropylcyclopentadienyl-1-fluorene.

10. A catalyst composition comprising a catalyst component comprised of:

(i) a compound (A) of the formula $$Ti(OR^1)_p R^2_q X^1_{4-p-q}$$

where $R^1$ and $R^2$ are independently hydrocarbon moieties of 1–24 carbon atoms selected from the group consisting of alkyl, alkenyl, aryl, and aralkyl group; $X^1$ is a halogen atom; $0 \leq p \leq 4$; $0 \leq q \leq 4$; and $0 \leq p+q \leq 4$;

(ii) a compound (B) of the formula $$M^2(OR^3)_m R^4_n X^2_{z-m-n}$$

where $R^3$ and $R^4$ each are hydrocarbon moieties of 1–24 carbon atoms; $X^2$ is a halogen atom; $M^2$ is a metal of Groups Ia–IIIa or IIb of the Periodic Table; z is the valence of $M^2$; $0 \leq m \leq 3$; $0 \leq n \leq 3$; and $1 \leq n+m \leq 3$;

(iii) an organocyclic compound (C) having two or more conjugated double bonds selected from the group consisting of indene, azulene, fluorene, hydrocarbyl-substituted cyclopentadiene, hydrocarbyl-substituted indene, hydrocarbyl substituted azulene, and hydrocarbyl-substituted fluorene; and (iv) a modified organoaluminum compound derived front reacting an organoaluminum compound with water and having 1–100 Al—O—Al groups in the molecule.

11. The catalyst composition as claimed in claim 10 wherein the modified organoaluminum compound has 1–50 Al—O—Al groups in the molecule.

12. The catalyst composition as claimed in claim 10 wherein the atomic ratio of aluminum in said modified organoaluminum compound to titanium in said catalyst component is 1:1 to 100,000:1.

13. The catalyst composition as claimed in claim 12 wherein said atomic ratio is 5:1 to 1,000:1.

14. The catalyst composition as claimed in claim 10 wherein said organoaluminum compound is a compound of the formula $$R_n AlX_{3-n}$$

where R is an alkyl, alkenyl, aryl or aralkyl group having a carbon number of 1–18, X is a hydrogen or halogen atom, and $1 \leq n \leq 3$.

15. The catalyst composition as claimed in claim 10 wherein said modified organoaluminum compound is the reaction product of said organoaluminum compound and water in a molar ratio of water to Al ranging from 0.25:1 to 1.2:1.

* * * * *